(12) United States Patent
Hahn

(10) Patent No.: US 6,425,438 B1
(45) Date of Patent: Jul. 30, 2002

(54) METHOD FOR DEFROSTING A CONTAINER AND A FROZEN LIQUID THEREIN

(75) Inventor: Terrance L. Hahn, Reading, MA (US)

(73) Assignee: DAN-KAR Corporation, Wilmington, MA (US)

( * ) Notice: Subject to any disclaimer, the term of this patent is extended or adjusted under 35 U.S.C. 154(b) by 5 days.

(21) Appl. No.: 09/592,967

(22) Filed: Jun. 13, 2000

(51) Int. Cl.$^7$ .................................................. F25C 5/08
(52) U.S. Cl. ........................ 165/47; 165/80.1; 165/80.5; 165/185; 62/352; 62/356; 62/373; 422/102; 422/300
(58) Field of Search .............................. 165/80.5, 80.1, 165/96, 185, 47; 422/99, 100, 102, 292, 300, 301; 436/180; 62/340, 349, 352, 356, 373, 71, 73

(56) References Cited

U.S. PATENT DOCUMENTS

| 2,109,822 | A | * | 3/1938 | Eddy .......................... 62/349 X |
| 2,632,453 | A | * | 3/1953 | Friedman .................... 62/349 X |
| 4,950,608 | A | | 8/1990 | Kishimoto .................... 435/290 |
| 5,061,630 | A | | 10/1991 | Knopf et al. ................. 435/290 |
| 5,349,899 | A | | 9/1994 | Tominaga et al. ........... 99/646 R |
| 5,670,120 | A | | 9/1997 | Degenhardt et al. ......... 422/104 |
| 5,863,507 | A | | 1/1999 | James ........................... 422/104 |
| 6,109,056 | A | * | 8/2000 | Feldpausch ................... 62/356 |
| 6,156,366 | A | * | 12/2000 | Waldstrom et al. ......... 62/349 X |
| 6,196,296 | B1 | * | 3/2001 | Wisniewski et al. ....... 62/352 X |
| 6,205,807 | B1 | * | 3/2001 | Broadbent ................... 62/352 X |

FOREIGN PATENT DOCUMENTS

JP 11-23127 * 1/1999

* cited by examiner

*Primary Examiner*—Ljiljana Ciric
(74) *Attorney, Agent, or Firm*—Pandiscio & Pandiscio; Scott R. Foster

(57) ABSTRACT

Method for rapidly defrosting a container and a frozen liquid therein, including the steps of providing a block of material of high heat transfer capability and defining a bore extending downwardly into the block from an upper surface thereof, the bore having an inside configuration and dimensions substantially equal to an outside configuration and dimensions of the container, such that when the container is disposed in the bore, substantially an entirety of an exterior of the container is in close adjacency with an interior of the bore, the block being devoid of contact with any heat source other than ambient heat, placing water in the bore, and placing the container in the bore, thereby squeezing the water into a thin film between the container and the interior of the bore.

9 Claims, 2 Drawing Sheets

METHOD FOR DEFROSTING A CONTAINER AND A FROZEN LIQUID THEREIN

BACKGROUND OF THE INVENTION

1. Field of the Invention

The invention relates to methods for warming containers and cold, often frozen, liquids therein, and is directed more particularly to such a method utilizing only ambient heat.

2. Description of the Prior Art

Microfuge tubes are well known in the art. They typically provide storage for up to about 1.5 milliliters of liquid and may be provided with a snap-top lid. The tubes are used in numerous laboratory settings and are produced and marketed by a number of biotech manufacturers and distributors. The tubes typically are of a plastic material, such as polypropylene and polystyrene. There is very little variation in size and shape, given the extensive number of accessory products and machinery designed for use with the tubes.

Microfuge tubes frequently are used to store liquid samples in a frozen state, typically between 0° C. and −80° C. Such frozen samples must be thawed before use. Often the thawing, or defrosting, procedure is undertaken on a daily basis. Because of the heat sensitive nature of many types of samples, such as protein stocks, cell lysates, enzymes, certain biochemicals, and the like, the tubes must be allowed to thaw out at room temperature, as opposed to applying heat from an active heat source to the tubes.

The time a researcher spends waiting for the samples to thaw often is wasted time. For example, it takes about twenty minutes for a one milliliter sample of water frozen at −20° C. to completely thaw out when left at room temperature.

To decrease the time required for thawing out frozen samples in microfuge tubes, there has been developed a defroster comprising a block of material of high heat transfer capability, the block defining a bore therein, the bore having a configuration and dimensions closely complementary to an outside configuration and dimensions of the microfuge tube, such that when the tube is disposed in the bore, substantially an entirety of an exterior of the tube is in snug contact with an interior of the bore. The block is devoid of contact with any heat source other than ambient heat. The defroster is shown and described in U.S. patent application Ser. No. 09/110,760, filed Jul. 3, 1998, now abandoned in the name of Lance D. Miller.

While the defroster described immediately above has greatly decreased thawing time required for frozen matter in microfuge tubes, it is deemed of benefit to reduce still further the required thawing time.

Accordingly, there is a need for a method which accelerates the defrosting or thawing out time of a liquid in a microfuge tube, and which does so utilizing only ambient temperature and no actively applied heat.

SUMMARY OF THE INVENTION

An object of the invention is, therefore, to provide a method which substantially reduces the time for thawing out of liquids in containers, such as microfuge tubes, without the need for active heat application.

With the above and other objects in view, as will hereinafter appear, a feature of the present invention is the provision of a method for more rapidly thawing out liquids in containers. The method includes providing a block of material of high heat transfer capability, the block defining a bore therein extending downwardly into the block from an upper surface thereof, the bore having an inside configuration and dimensions complementary to an outside configuration and dimensions of the container, placing a small amount of liquid at room temperature in the bore, and placing the container in the bore, such that when the container is disposed in the bore, an exterior of the container is in contact with a film of the liquid coating an interior of the bore, the block and liquid being devoid of contact with any heat source other than ambient heat.

The above and other features of the invention, including various novel details and combinations of method steps, will now be more particularly described with reference to the accompanying drawings and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
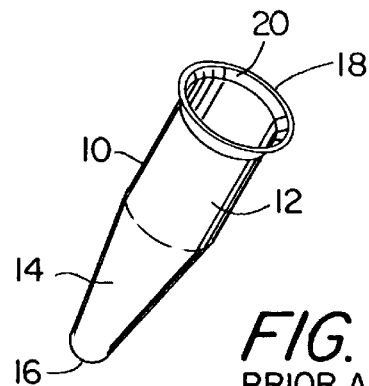
FIG. 1 is a perspective view of a prior art microfuge tube of the type with which the inventive microfuge tube defrosting method finds utility.

Referring to the FIG. 1, it will be seen that the microfuge tube 10 with which the inventive method finds utility includes a cylindrically-shaped portion 12 and a conically-shaped portion 14 extending distally from the cylindrically-shaped portion 12 to a rounded distal end 16. At the proximal end 18 of the cylindrically-shaped portion 12, there is provided an outwardly-flared collar 20.

The cylindrically-shaped portion 12 is of a diameter of about 0.43 inch and of a length of about 0.54 inch. The conically-shaped 14 portion 14 tapers at an angle of about 20° and i s about 0.8 inch in length. The collar 20 extend s outwardly beyond the cylindrically-shaped portion 12 by about 0.06 inch. Thus, the overall length of the tube 10 is about 1.4 inch.

The tube collar 20 receives a lid (not shown) in snap-on fashion.

Figure 2:
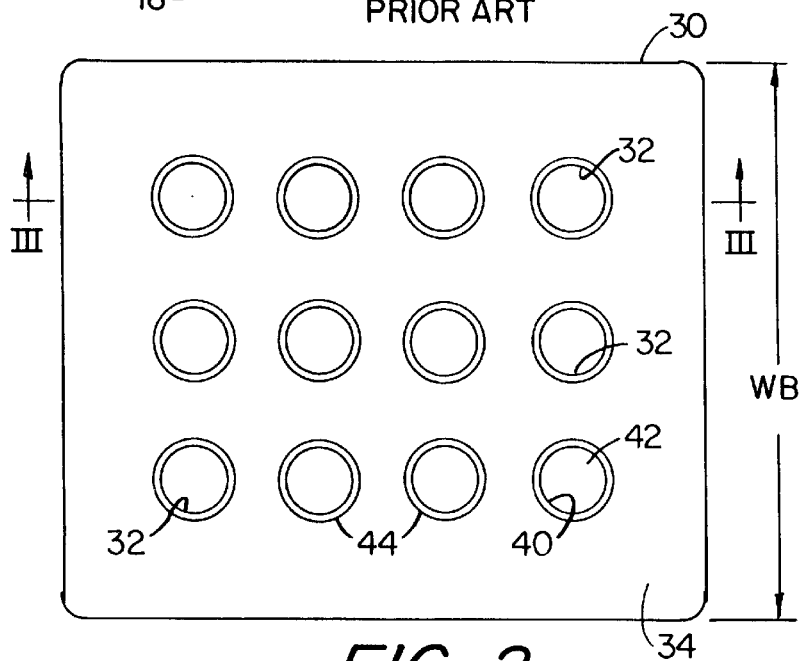
FIG. 2 is a top plan view of one form of microfuge tube defroster used in carrying out the invention.
Figure 3:
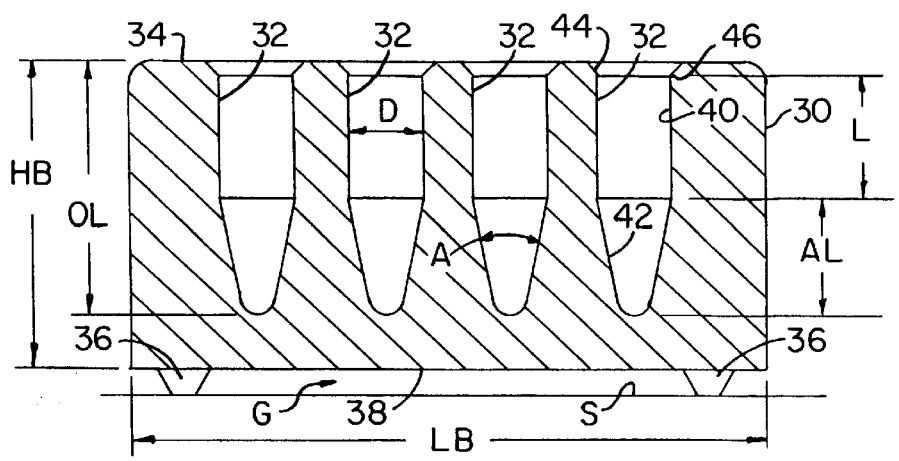
FIG. 3 is a sectional view taken along line III—III of FIG. 2.

Referring to FIGS. 2 and 3, it will b e seen that a device used in carrying out the inventive method includes a block 30 of material of high heat transfer capability, preferably aluminum or an alloy of aluminum. The block 30 defines one or more bores 32 therein (twelve shown in FIG. 2) extending downwardly into the block 30 from an upper surface 34 thereof. The bores 32 are each provided with an inside configuration and dimensions closely complementary to the outside configuration and dimensions of the microfuge tube 10 shown in FIG. 1. Accordingly, when one or more of the microfuge tubes 10 are respectively placed in a bore 32, substantially the entirety of the exterior of the tube is in snug adjacency with the interior of the bore. The block 30 is devoid of contact with any heat source.

When the block 30 is provided with a plurality of bores 32, the bores 32 extend into the block parallel to each other and spaced from each other a distance sufficient to preclude tube-to-tube contact.

The block 30 is provided with legs 36, preferably of rubber, extending from a bottom surface 38 (FIG. 3) of the block for supporting the block on a surface S. The legs 36 provide for an air gap G between the surface S and the block bottom surface 38. The bottom surface 38 of the block 30 is thereby rendered accessible to the ambient heat.

As noted above, each bore 32 is of a configuration and size substantially complementary to the configuration and size of the microfuge tube 10. In furtherance thereof, each bore 32 is provided with a cylindrical portion 40 having a diameter D of about 0.43 inch and about 0.54 inch in length L, a distal conically-shaped portion 42 tapered at an angle A of about 20° and of an axial length AL of about 0.8 inch, and an annular recess portion 44 extending outwardly from a proximal end 46 of the cylindrical portion 40 about 0.06 inch and extending axially about 0.06 inch to join the block upper surface 34. The overall length OL of each of the bores 32 is thus about 1.4 inch.

The block may be of a size selected to accommodate a selected number of microfuge tubes, or other containers. In the embodiment shown in FIGS. 2 and 3, for holding twelve of the microfuge tubes, a preferred length LB of the block is about 4.25 inches, a preferred width WB about 3.44 inches, and a preferred height HB, less the legs 36, about 1.75 inches.

Thus, the microfuge tubes 10 are snugly received by the bores and virtually all of the external surface of the tube is in close adjacency with the internal surface of the bore in which the tube is disposed.

Figure 4:
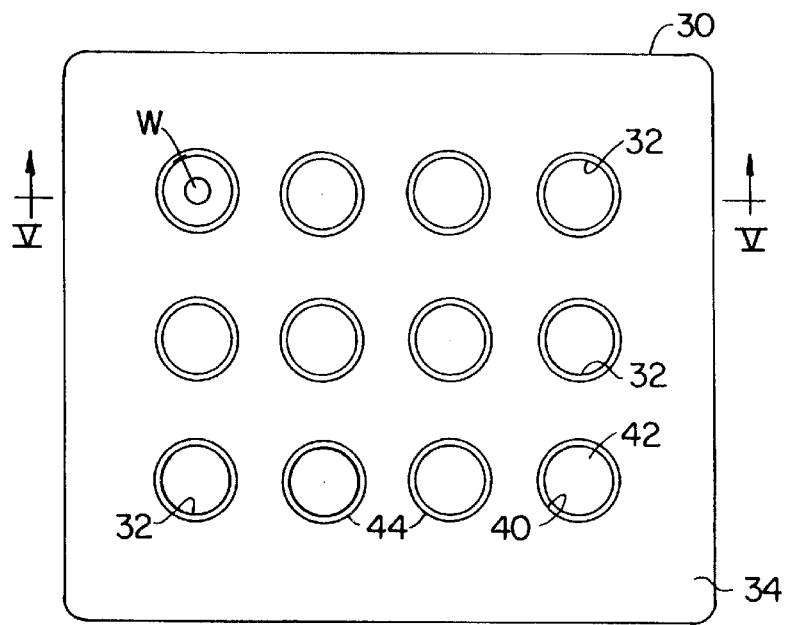
FIG. 4 is similar to FIG. 2, but illustrative of a step in the inventive method.
Figure 5:
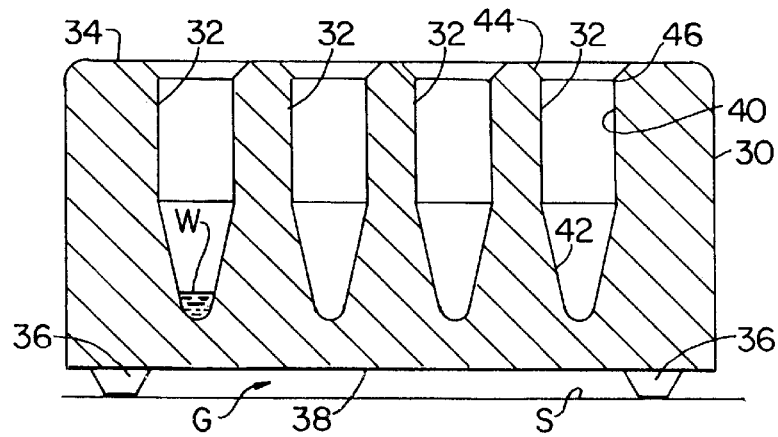
FIG. 5 is a sectional view taken along line V—V of FIG. 4.
Figure 6:
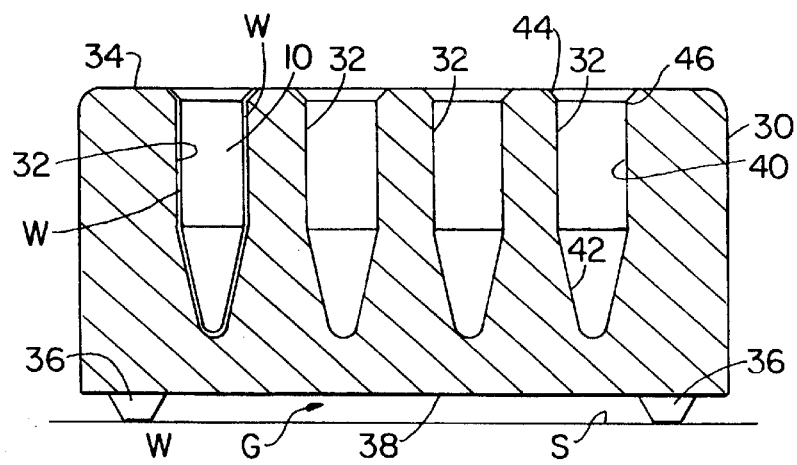
FIG. 6 is similar to FIG. 5, but illustrative of a further step in the inventive method.

In operation of the inventive method, a small amount (such as a drop) of liquid, typically water, is placed in each bore 32 to receive a tube 10 (one shown in FIGS. 4 and 5). The tubes 10 are removed from a cooled area, such as a freezer or refrigerator, and are placed in the block 30 which, in turn, is placed on the support surface S, which may be a shelf, table top, or the like. No active heat, such as electricity, is connected to, or otherwise applied to, the block 30. The water W is squeezed into the form of a thin film between the tube and the interior walls of the bore 32. While the bores 32 appear to have smooth internal surfaces, it will be appreciated that the micro configuration thereof is a series of "hills" and "valleys". It will be apparent that some of the "hills" may contact the tube and leave little or no room for the liquid film, while the "valleys" may accommodate a relatively thick film of liquid. The liquid and the highly heat conductive block 30 in effect transfer the "cold" away from the tubes at a rate much faster than air temperature alone. Further, the presence of the liquid results in transferring the cold away from the tubes at a rate much faster than the blocks alone, without the liquid. Three features contribute to accelerated thawing or defrosting of the liquid samples in the tube 10. Firstly, the aluminum composition of the blocks, aluminum being ranked the metal having highest heat transfer capacity; secondly, the snug fit between the bores 32 and the tubes 10; and thirdly, the presence of the liquid film between the bores and the tubes. The heat transfer capacity of the aluminum is augmented by the almost total surface contact between the aluminum and the liquid and the liquid and the frozen tube.

In tests, 0.5 ml of water has been 95% thawed from −20° C. in about two minutes, ten seconds, compared to 12 minutes, 30 seconds when the tubes are simply exposed to room temperature. Similarly, 1.0 ml of water has been 95% thawed from −20° C. in about two minutes, forty seconds, compared to 19 minutes, 15 seconds when left on a bench surface at room temperature. Thus, the method presented herein facilitates the thawing of tubes roughly 6 to 8 times faster and without the addition of heat.

It is to be understood that the present invention is by no means limited to the particular method steps herein disclosed and/or shown in the drawings, but also comprises any modifications or equivalents within the scope of the claims. For example, while the above description is for the most part directed to a method for warming microfuge tubes, and while it is anticipated that such use will be a major area of use for the method, it will be appreciated that other containers of different shape and size than microfuge tubes are susceptible to accelerated warming by a similar method, utilizing a device configured and sized to correspond to the particular container concerned.

What is claimed is:

1. A method for rapidly defrosting a container and a frozen liquid in the container, the method comprising the steps of:

providing a block of material of high heat transfer capability, the block defining a first bore extending downwardly into the block from an upper surface of the block, the bore having an inside configuration and dimensions substantially equal to an outside configuration and dimensions of the container, such that when the container is disposed in the bore, substantially an entirety of an exterior of the container is closely adjacent an interior of the bore;

placing a small amount of liquid in the bore; and placing the container in the bore, thereby squeezing the liquid into a thin film between the container and the interior of the bore;

wherein the heat transfer capability of the block, and the close adjacency of the container and the bore interior, and the liquid film between the container and the interior of the bore, facilitate the rapid defrosting of the container and the frozen liquid in the container.

2. The method in accordance with claim 1 wherein the block material is a selected one of aluminum and aluminum alloy.

3. The method in accordance with claim 1 wherein the block defines at least one further bore therein, the further bore extending parallel to the first bore and spaced sufficiently therefrom to prevent contact between containers therein.

4. The method in accordance with claim 1 wherein the container comprises a microfuge tube.

5. The method in accordance with claim 4 wherein the bore includes a cylindrical portion, a distal conically-shaped portion leading to a distal-most rounded end, and a proximal annular recess portion flared outwardly from a proximal end of the cylindrical portion, all of the portions being disposed in close adjacency with the tube when the tube is placed in the bore.

6. The method in accordance with claim 1 wherein the liquid is water and the small amount thereof is a drop.

7. A method for rapidly defrosting a plurality of microfuge tubes, the method comprising the steps of:

providing a block of high heat transfer capability, the block defining a plurality of bores extending in parallel fashion downwardly into the block from an upper surface of the block, each of the bores having an inside configuration and dimensions substantially equal to an outside configuration and dimensions of each of the tubes, such that when the tubes are disposed in the bores, respectively, substantially an entirety of an exterior of each tube is in close adjacency with an interior of one of the bores;

placing a small amount of liquid in selected ones of the bores, and placing the tubes, respectively, in the selected bores;

thereby to squeeze the liquid into a thin film between the tube and the interior of the respective selected bore around the tube;

wherein the heat transfer capability of the block, and the close adjacency of the tube and the bore interior, and the liquid film between the tube and the interior of the bore, facilitate the rapid defrosting of the tube.

8. The method in accordance with claim 7 wherein the liquid is water and the small amount is a drop.

9. The method in accordance with claim 8 wherein each of the bores includes a cylindrical portion, a distal conically-shaped portion leading to a distal-most rounded end, and a proximal annular recess portion flared outwardly from a proximal end of the cylindrical portion, all of the portions being in the close adjacency with one of the tubes when the one tube is disposed in one of the bores.

* * * * *